United States Patent
McLaughlin, II (10) Patent No.: US 10,605,930 B2
(45) Date of Patent: Mar. 31, 2020

(54) ANALYZER DEVICE FOR RADIATION DETECTOR

(71) Applicant: SAINT-GOBAIN CERAMICS & PLASTICS, INC., Worcester, MA (US)

(72) Inventor: Michael T. McLaughlin, II, Lyndhurst, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 208 days.

(21) Appl. No.: 15/725,694

(22) Filed: Oct. 5, 2017

(65) Prior Publication Data

US 2018/0106909 A1  Apr. 19, 2018

Related U.S. Application Data (60) Provisional application No. 62/404,323, filed on Oct. 5, 2016.

(51) Int. Cl.
    *G01T 1/20* (2006.01)
(52) U.S. Cl.
    CPC .................. *G01T 1/2018* (2013.01)
(58) Field of Classification Search
    CPC .................. G01T 1/2018; G01T 1/20
    See application file for complete search history.

(56) References Cited

U.S. PATENT DOCUMENTS

| | | | |
|---|---|---|---|
| 6,160,259 A | 12/2000 | Petrillo et al. | |
| 6,215,122 B1 | 4/2001 | Clifford et al. | |
| 7,342,231 B2 | 3/2008 | Warburton et al. | |
| 8,598,533 B2 | 12/2013 | Menge et al. | |
| 8,884,233 B2 | 11/2014 | Cherepy et al. | |
| 2007/0051892 A1 | 3/2007 | Warburton et al. | |
| 2009/0039271 A1* | 2/2009 | Farsoni | G01T 1/202 250/367 |
| 2010/0243877 A1 | 9/2010 | Berheide et al. | |
| 2012/0132823 A1* | 5/2012 | Menge | G01T 3/06 250/390.11 |
| 2014/0131564 A1 | 5/2014 | Duraj et al. | |
| 2014/0131620 A1 | 5/2014 | Walker et al. | |
| 2015/0090888 A1 | 4/2015 | Yang | |
| 2016/0069919 A1 | 3/2016 | Holmes et al. | |

FOREIGN PATENT DOCUMENTS

JP  2004020423 A  1/2004

OTHER PUBLICATIONS

International Search Report and Written Opinion for PCT/US2017/055296, dated Jan. 23, 2018, 14 pages.

* cited by examiner

*Primary Examiner* — Bryan Bui
(74) *Attorney, Agent, or Firm* — Abel Schillinger, LLP; Robert N. Young (57) ABSTRACT

An analyzer device can receives a pulse from a photosensor, obtain an initial calculated area under a curve representing the pulse, and obtain a recalculated area under the curve representing the pulse. In an embodiment, the initial calculated area and the recalculated area can base obtained via initial and subsequent integrations, respectively. The initial and subsequent integrations can be performed for different integration time periods. The subsequent integration may allow for the pulse height resolution to be determined more accurately.

18 Claims, 3 Drawing Sheets

ANALYZER DEVICE FOR RADIATION DETECTOR

CROSS-REFERENCE TO RELATED APPLICATION

The present application claims priority under 35 U.S.C. § 119(e) to U.S. Provisional Patent Application No. 62/404,323, filed Oct. 5, 2016, entitled "Analyzer Device for Radiation Detector," naming as an inventor Michael T. McLaughlin II, which application is assigned to the current assignee hereof and is incorporated by reference herein in its entirety.

FIELD OF THE DISCLOSURE

The present disclosure is directed to an analyzer device and methods of using such analyzer devices.

BACKGROUND

Radiation detection apparatuses are used to detect, track, and identify high-energy particles. A scintillator-based detection apparatus uses a scintillator material to absorb the energy of incoming radiation and scintillate and remit the absorbed energy in the form of photons. A photosensor detects the emitted photons and emits a corresponding electrical pulse. An analyzer device analyzes the electrical pulse to provide information about the incoming radiation. Continued improvements are desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the radiation detection and pulse analysis arts.

An analyzer device can be configured to receive an output signal from a photosensor comprising a pulse; obtain an initial calculated area $A_I$ under a curve representing the pulse via an initial integration; and obtain a recalculated area $A_R$ under the curve representing the pulse via a subsequent integration. The initial and subsequent integrations may be performed using different integration time periods on the same pulse. In an embodiment, an initial integration time period may be a default integration time period used for different pulses. When the pulse is strong, the integration time period for the subsequent integration may be lengthened, and when the pulse is weak, the integration time period may be shortened. The subsequent integration can help to obtain a more accurate pulse height resolution for the pulse. The description below provides for radiation detection systems that can include the analyzer device and corresponding methods.

Figure 1:
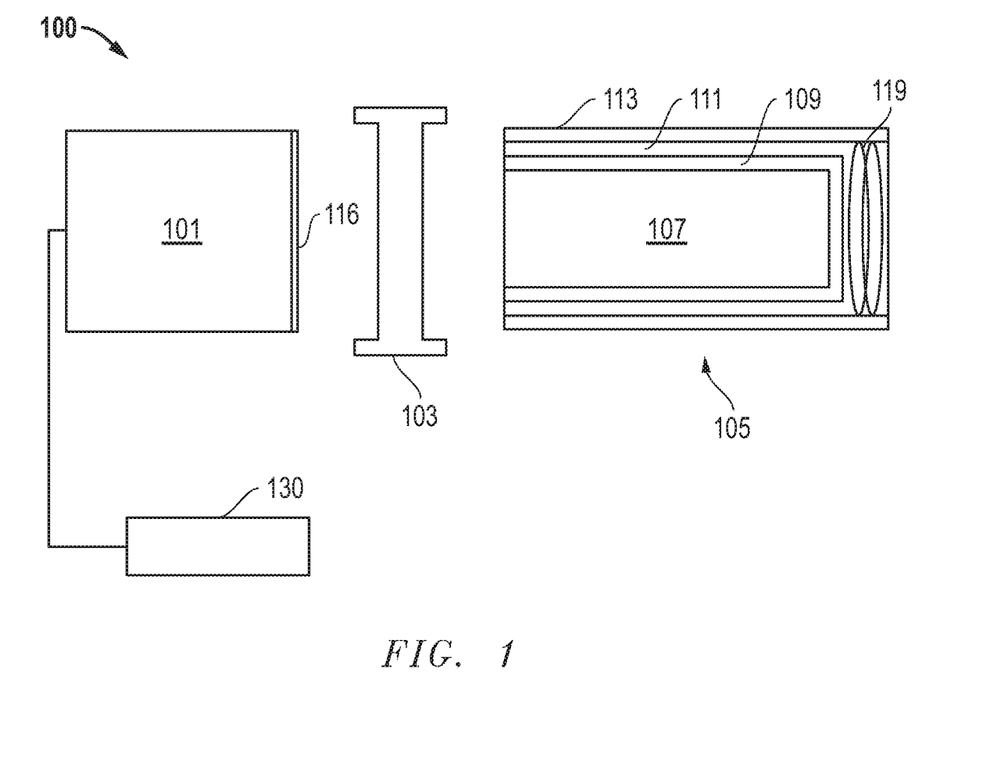
FIG. 1 includes an illustration of a radiation detection apparatus according to embodiments described herein.

FIG. 1 illustrates an embodiment of a radiation detector system 100. The radiation detection system can be a medical imaging apparatus, a well logging apparatus, a security inspection apparatus, nuclear physics applications, or the like. In a particular embodiment, the radiation detection system can be used for prompt-gamma neutron activation analysis (PGNAA).

In the embodiment illustrated, the radiation detection system 100 includes a photosensor 101, an optical interface 103, and a scintillation device 105. Although the photosensor 101, the optical interface 103, and the scintillation device 105 are illustrated separate from each other, skilled artisans will appreciate that photosensor 101 and the scintillation device 105 can be coupled to the optical interface 103, with the optical interface 103 disposed between the photosensor 101 and the scintillation device 105. The scintillation device 105 and the photosensor 101 can be optically coupled to the optical interface 103 with other known coupling methods, such as the use of an optical gel or bonding agent, or directly through molecular adhesion of optically coupled elements.

The photosensor 101 can be a photomultiplier tube (PMT), a solid-state photomultiplier (SiPM), a hybrid photosensor, or any combination thereof. The photosensor 101 can receive photons emitted by the scintillation device 105, via an input window 116, and produce an output signal. The output signal from the photosensor 101 can be received by an analyzer device 130 to analyze the output signal and provide a count of the photons received at the photosensor 101 or other information.

In an embodiment, the output signal from the photosensor 101 can include a plurality of electronic pulses. The electronic pulses can be based on the number of photons the photosensor receives 101. Each individual pulse is represented by a curve and the radiation detection system can include an integration system, within the analyzer device 130 or another device, that calculates the area of each individual pulse. As used herein, calculating the area of a pulse refers to calculating the area under the curve representing the pulse. The individual pulses can make up any number of the plurality of pulses of the output signal, such as a majority of the plurality of pulses of the output signal, or each of the plurality of pulses of the output signal. The individual pulses and their calculated areas can be used to form a spectrum representing the activity of a source as a function of energy. The spectrum can have an energy peak and an energy resolution, also referred to as PHR. The energy resolution is the energy range at full-width of half maximum ("FWHM") of the energy peak divided by the energy corresponding to the peak, expressed as a percent. A lower energy resolution value, which is desired, means that the energy peak can be resolved more readily.

In an embodiment, the integration system can calculate the area for each individual pulse more than once. For example, the integration system can run an initial integration to calculate the area of the pulse and a subsequent integration to recalculate the area of the pulse. In certain embodiments, the integration system can calculate (including initial calculation and recalculation) the area of an individual pulse at least n times, where n can be at least 2, or at least 3, or at least 4. Further, in certain embodiments, n can be at most 8, or at most 7, or at most 6, or at most 5. Moreover, n can be in a range of any of the above minimum and maximum values, such as in a range of 2 to 8, or 2 to 7, or 2 to 6, or 3 to 6.

Figure 2:
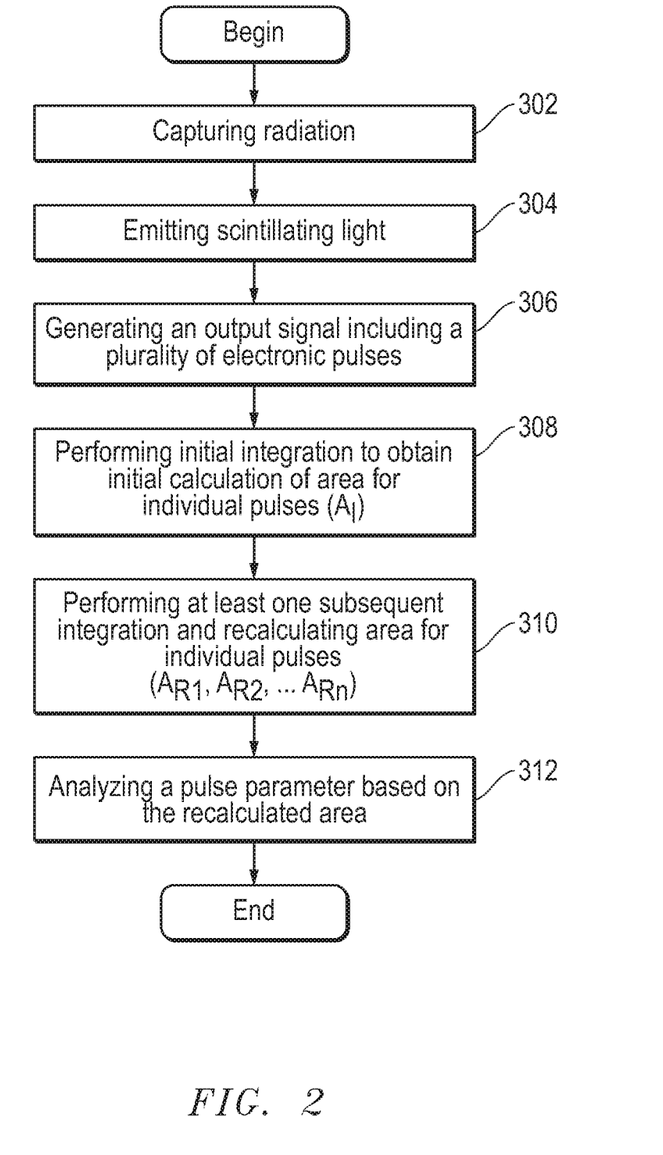
FIG. 2 includes a schematic of a method of integrating a pulse according to embodiments described herein.

FIG. 2 includes a flowchart of an exemplary method of using the radiation detection system 100 including the analyzer device 130. The method will be described with respect to components within the radiation detection system 100 as illustrated in FIG. 1. After reading this specification, skilled artisans will appreciate that activities described with respect to particular components may be performed by another component. Further, activities described with respect to particular components may be combined into a single component, and activities described with respect to a single component may be distributed between different components.

The method can begin with capturing radiation and emitting scintillating light, at blocks 302 and 304 in FIG. 2. The radiation can be captured by the scintillator 107, and the scintillating light can be emitted by the scintillator 107 in response to capturing the radiation. Such radiation capture and scintillating light emission corresponds to a scintillation event. The method can further include generating a plurality of electronic pulses, at block 306. The photosensor 101 can generate the plurality of electronic pulses in response to receiving the scintillating light.

The electronic pulses can be provided to the integration system, which may be within the analyzer device 130 or another device. In an embodiment, the integration system may perform an initial integration on an individual pulse of the output signal, at block 308, to obtain an initial calculation of the area, $A_I$, of the pulse. In an embodiment, the integration system may perform at least one subsequent integration, at block 310, to obtain a recalculation of the area, $A_R$, of the pulse.

The energy resolution of a spectrum based on the initial calculation of the areas, $A_I$, of the individual pulses is represented by $PHR_I$, whereas the energy resolution of a spectrum based on recalculated areas, $A_R$, of the individual pulses is represented by $PHR_R$. Both $PHR_I$ and $PHR_R$ are measured in the same manner except for the number of calculations of the areas of the individual pulses. In an embodiment, $PHR_R$ can have a lower value, which is desired, than $PHR_I$. For example, in an embodiment, the $PHR_R$ is at most 99.6%, or at most 99.4%, or at most 99.2%, or at most 99%, of the $PHR_I$. In an embodiment, the $PHR_R$ is at least 91%, or at least 93%, or at least 95% of $PHR_I$.

Figure 3:
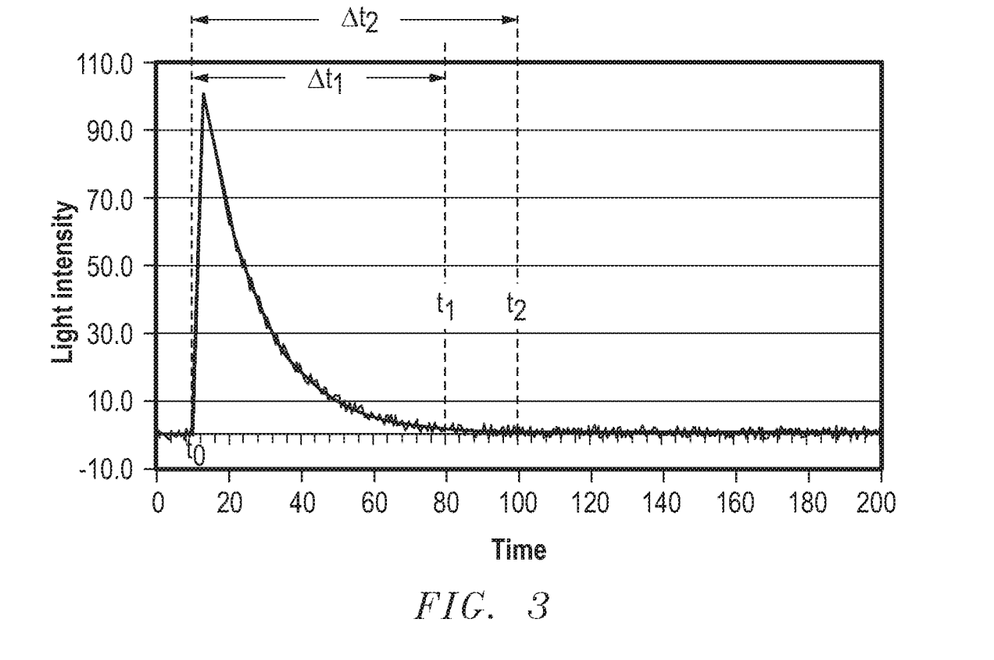
FIG. 3 includes an illustration of an initial integration time period of $\Delta t_1$ and a subsequent integration time period lengthened to $\Delta t_2$ of an individual pulse.
Figure 4:
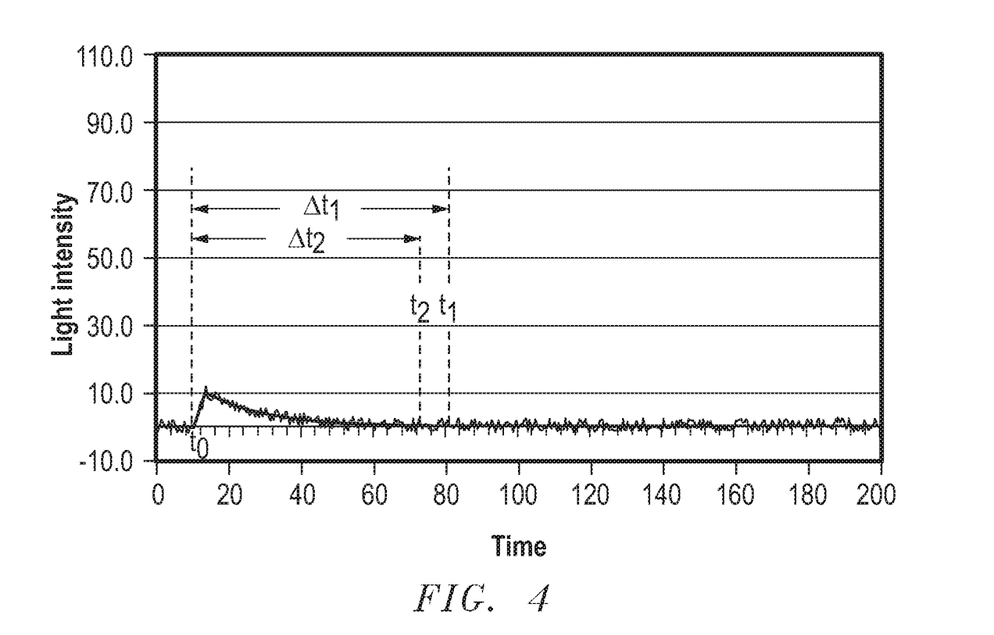
FIG. 4 includes an illustration of an initial integration at integration time period of $\Delta t_1$ and a subsequent shortened integration time period of $\Delta t_2$ of an individual pulse.

As illustrated in FIGS. 3 and 4, the recalculation of the individual pulse can include lengthening (FIG. 3) or shortening (FIG. 4) the integration time period for a subsequent integration. In a particular embodiment, the change in integration time period can be based on an intensity value obtained based on the initial integration.

In an embodiment, the calculation of the area, $A_I$, of the individual pulse can be based on an integration time period $\Delta t_1$, and the recalculation of the area, $A_R$, of the pulse can be based on an integration time period $\Delta t_2$. The integration time period $\Delta t_1$ can have a time period $t_0$ to $t_1$, and the integration time period $\Delta t_2$ can have a time period $t_0$ to $t_2$. In a particular embodiment, $\Delta t_2$ is at most 99%, or at most 97%, or at most 95%, or at most 93%, or at most 91%, or at most 89% of $\Delta t_1$, or vice versa. In a particular embodiment, $\Delta t_2$ is at least 60%, or at least 65%, or at least 70%, or at least 75%, or at least 80% of $\Delta t_1$, or vice versa.

For example, the difference between $\Delta t_1$ and $\Delta t_2$ can be at least at least 1 ns, or at least 3 ns, or at least 5 ns, or at least 7 ns, or at least 9 ns, or at least 11 ns. In an embodiment, the difference between $\Delta t_1$ and $\Delta t_2$ can be at most 40 ns, at most 35 ns, or at most 30 ns, or at most 25 ns, or at most 20 ns. Moreover, the difference between $\Delta t_1$ and $\Delta t_2$ can be in a range of any of the above minimum and maximum values, such as 1 to 40 ns, or 3 to 35 ns, or 5 to 30 ns, or 7 to 25 ns, or 9 to 20 ns.

In a further embodiment, the subsequent integration can include at least 2 integrations, or at least 2 recalculations of the area of the pulse, for a total of at least 3 calculations of the area of the pulse. For example, the recalculation of the area, $A_R$, of the individual pulse can include a first recalculation of the area, $A_{R1}$, of the individual pulse and a second recalculation of the area, $A_{R2}$, of the individual pulse. In an embodiment, the second recalculation of the area, $A_{R2}$, of the individual pulse can be based on an integration time period $\Delta t_3$ that is different from at least one or both of $\Delta t_1$ and $\Delta t_2$. In a particular embodiment, $t_3$ is at most 99%, or at most 97%, or at most 95%, or at most 93%, or at most 91%, or at most 89% of $\Delta t_1$ or $\Delta t_2$, or vice versa. In a particular embodiment, $t_3$ is at least 60%, or at least 65%, or at least 70%, or at least 75%, or at least 80% of $\Delta t_1$ or $\Delta t_2$, or vice versa.

For example, the difference between the integration time period $\Delta t_3$ and at least one of $\Delta t_1$ and $\Delta t_2$ can be at least 1 ns, or at least 3 ns, or at least 5 ns, or at least 7 ns, or at least 9 ns, or at least 11 ns. In another example, the difference between the integration time period $\Delta t_3$ and at least one of $\Delta t_1$ and $\Delta t_2$ can be at most 40 ns, at most 35 ns, or at most 30 ns, or at most 25 ns, or at most 20 ns. Moreover, the difference between $\Delta t_3$ and at least one of $\Delta t_1$ and $\Delta t_2$ can be in a range of any of the above minimum and maximum values, such as 1 to 40 ns, or 3 to 35 ns, or 5 to 30 ns, or 7 to 25 ns, or 9 to 20 ns.

Referring again to FIG. 3, the method can also include analyzing the pulse shape, at block 312 in FIG. 2. The analyzer device 130 can be configured to perform a variety of tasks. Some of the tasks listed herein are intended to be exemplary and not limiting.

Referring again to FIG. 1, the photosensor 101 can be electrically coupled to an input of an analyzer device 130. The photosensor 101 can be housed within a tube or housing made of a material capable of protecting the photosensor 101, the analyzer device 130, or a combination thereof, such as a metal, metal alloy, other material, or any combination thereof. Although not illustrated in FIG. 1, an amplifier may be used to amplify the electronic signal from the photosensor 101 before it reaches the analyzer device 130. The electronic pulses can be shaped, digitized, analyzed, or any combination thereof by the analyzer device 130 to provide a count of the photons received at the photosensor 101 or other information. In an embodiment, the analyzer device 130 can include the integration system, as well as an amplifier, a pre-amplifier, an analog-to-digital converter, a photon counter, another electronic component, or any combination thereof.

The analyzer device 130 can include hardware and can be at least partly implemented in software, firmware, or a combination thereof. In an embodiment, the hardware can include a plurality of circuits within a field programmable gate array (FPGA), an application specific integrated circuit (ASIC), another integrated circuit or on a printed circuit board, or another suitable device, or any combination thereof. The analyzer device 130 can also include a buffer to temporarily store data before the data are analyzed, written to storage, read, transmitted to another component or device, another suitable action is performed on the data, or any combination thereof.

In an embodiment, the analyzer device 130 can include an amplifier coupled to a photosensor output 110, such that an electronic pulse from the photosensor 101 can be amplified before analysis. The amplifier can be coupled to an analog-to-digital converter (ADC) that can digitize the electronic pulse. The ADC can be coupled to a field programmable gate array (FPGA) that can include circuits to analyze the shape of the electronic pulse and determine a compensation coefficient using a look-up table. The look-up table can be part of the FPGA or may be in another device, such as an integrated circuit, a disk drive, or a suitable persistent memory device. The ADC, the FPGA, or another device performing digitization, pulse analysis, compensation coefficient generation, adjustment of a pulse parameter, or any combination thereof can have an operational frequency of 1 GHz.

A multichannel analyzer (MCA) can be coupled to the device that includes the look-up table or to the FPGA. The MCA can generate pulse height spectrum based on the scintillation pulses, wherein the pulses may at least in part be based on compensated electronic pulses. Another device may be used in conjunction with or in place of the MCA. In an embodiment, the other device can include a discriminator to analyze the adjusted electronic pulse to identify a particular type of radiation, such as gamma, x-ray, neutrons, or beta, and send a signal to the appropriate counter, such as a pulse counter. In another embodiment, the compensated electronic pulse is analyzed to determine a particular radiation source, such as $^{60}$Co, $^{137}$Cs, or another suitable radiation source that corresponds to the scintillation event. The MCA may not be used for this embodiment. For example, the adjusted pulse may be used to image a radiation source that emitted radiation that was captured by the scintillator 107. Other devices may be used in other embodiments, depending on the particular application.

Further, additional parameters can be adjustable at the analyzer device 130 based on a property of the scintillator 107. In an example, a threshold can be adjusted depending on a relative decay time for a neutron-induced pulse compared to a relative decay time for a gamma radiation-induced pulse, with respect to a particular scintillating material that is responsive to both neutrons and gamma radiation. If a threshold is set too low, pulse shape may be difficult to analyze for a scintillating material or application that has a relatively higher noise level. If the threshold is set too high, however, pulse shape may not be identifiable enough to distinguish neutron-induced pulses from gamma radiation-induced electrical pulses for a scintillating material characterized by a less intense electrical pulse. Thus, adjustment of the threshold can assist in pulse identification by balancing reduction of noise with accuracy and speed of correctly identifying the pulse shape for different scintillating materials.

In an embodiment, scintillator 107 can include an inorganic scintillation material. For example, the scintillation material can include a sodium iodide, a cesium iodide, a bismuth germinate, a lanthanum bromide, a cerium bromide, a lanthanum chloride, a lutetium oxyorthosilicate, a lutetium yttrium oxyorthosilicate, a cesium lithium lanthanum bromide, a cesium lithium lanthanum bromo-chloride, a cesium lithium yttrium chloride, or any combination thereof. In a particular embodiment, the scintillation material can include a rare earth halide. A particularly well-suited material can have the chemical formula of $La_{(1-x)}Ce_xBr_{(3-3y)}Cl_{(3y)}$, wherein x is any number in the range of 0 to 1 and y is any number in the range of 0 to 1. In a particular embodiment, x can be any number in the range of $1\times10^{-3}$ to 0.4. In an alternative embodiment, the scintillator 10 can include $La_{(1-x)}Ce_xBr_3$, wherein x is any number in the range of $1\times10^{-3}$ to 0.4, $Lu_{2(1-a)}Y_{2a}SiO_5$, wherein a is any number in a range of 0 to 1, $PbWO_4$, $BaF_2$, $CeF_3$, or another suitable fast responding scintillator. Such scintillators may or may not include an activator.

In another embodiment, the scintillator 107 can include an organic scintillation material, such as an anthracene, a stilbene, or a plastic. In a particular embodiment, the organic scintillation material can include an aromatic compound. In a particular embodiment, the aromatic compound can be a homoaromatic compound or a heteroaromatic compound. In a more particular embodiment, the aromatic compound includes a phenyl or pyrazoline aromatic compound. In another particular embodiment, the organic scintillation material can include 2,5-diphenyloxazole ("PPO"), 9,10-diphenylanthracene ("DPA"), p-terphenyl, 1,4-bis[2-methylstyryl benzene] ("bis-MSB"), 1,4-bis(5-phenyloxazol-2-yl) benzene, naphthalene, and 1,1,4,4-tetraphenyl-1,3 butadiene ("TPB"), another suitable organic compound, or any combination thereof. The organic scintillation material can be mixed into a solvent, such as toluene, 1-phenyl-1-xylyl ethane ("PXE"), linear alkyl benzene ("LAB"), or another solvent. In an embodiment, the combination of the organic scintillation material and the solvent can be mixed into and dissolve within the polymer matrix.

In an embodiment, the scintillator can be a large volume scintillator, having a volume of at least 1500 cm$^3$, or at least 1700 cm$^3$, or at least 1900 cm$^3$. In an embodiment, the scintillator can have a length of at least 31 cm, or at least 33 cm, or at least 35 cm, or at least 37 cm, or at least 39 cm.

Further, the scintillator 107 can be substantially surrounded by a reflector 109. In one embodiment, the reflector 109 can include polytetrafluoroethylene (PTFE), another material adapted to reflect light emitted by the scintillator 107, or a combination thereof. In an illustrative embodiment, the reflector 109 can be substantially surrounded by a shock absorbing member 111. The scintillator 107, the reflector 109, and the shock absorbing member 111 can be housed within a casing 113.

The scintillation device 105 includes at least one stabilization mechanism adapted to reduce relative movement between the scintillator 107 and other elements of the scintillation device 105, such as the casing 113, the shock absorbing member 111, the reflector 109, or any combination thereof. The stabilization mechanism may include a spring 119, an elastomer, another suitable stabilization mechanism, or a combination thereof. The stabilization mechanism can be adapted to apply lateral forces, horizontal forces, or a combination thereof, to the scintillator 107 to stabilize its position relative to one or more other elements of the radiation detection system 100.

As illustrated, the optical interface 103, if present, is adapted to be coupled between the photosensor 101 and the scintillation device 105. The optical interface 103 is also adapted to facilitate optical coupling between the photosensor 101 and the scintillation device 105. The optical interface 103 can include a polymer, such as a silicone rubber, that is used to mitigate the refractive indices difference between the scintillator 107 and the input window 116 of the photosensor 101. In other embodiments, the optical interface 103 can include gels or colloids that include polymers and additional elements.

Further, in an embodiment, the radiation detection apparatus can be adapted to detect radiation having an energy of at least 15 keV, or at least 25 keV, or at least 50 keV, or at least 75 keV, or at least 100 keV. In an embodiment, the radiation detection apparatus can be adapted to detect radiation having an energy of at most 20 MeV, or at most 10 MeV, or at most 5 MeV, or at most 3 MeV. For example, the radiation detector can have an energy range of 25 keV to 3 MeV for detectors such as handheld detectors or a range of 100 keV to 10 MeV for material analysis, such as prompt gamma ray neutron activation analysis ("PGNNA").

In an embodiment, the radiation detection apparatus can be adapted to detect a gamma ray, an x-ray, a neutron, or any combination thereof. In a particular example, the radiation detection apparatus can be a dual mode radiation detection apparatus adapted to detect gamma rays and neutrons. In a further particular embodiment, the radiation detection apparatus can be adapted to perform prompt-gamma neutron activation analysis (PGNAA).

In a particular embodiment, the radiation detection apparatus can be one of a security detection apparatus, a well-logging detection apparatus, a gamma ray spectroscopy apparatus, an isotope identification apparatus, Single Positron Emission Computer Tomography (SPECT) analysis apparatus, a Positron Emission Tomography (PET) analysis apparatus, and an x-ray imaging apparatus.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Embodiment 1

An analyzer device configured to: receive an output signal from a photosensor comprising a pulse; obtain an initial calculated area $A_I$ under a curve representing the pulse via an initial integration; and obtain a recalculated area $A_R$ under the curve representing the pulse via a subsequent integration.

Embodiment 2

A method of processing an output signal, comprising: receiving the output signal from a photosensor comprising a pulse; performing an initial integration to obtain an initial calculated area $A_I$ under a curve representing the pulse; and performing a subsequent integration to obtain a recalculated area $A_R$ under the curve representing the pulse.

Embodiment 3

The device or method of any one of the preceding Embodiments, wherein the output signal includes a plurality of pulses, and an initial calculated area $A_I$ and recalculated area $A_R$ are obtained for each of the plurality of pulses.

Embodiment 4

The device or method of any one of the preceding Embodiments, wherein a spectrum based on the subsequent integration has an energy resolution $PHR_R$ that is less than an energy resolution $PHR_I$ of the spectrum based on the initial integration.

Embodiment 5

The device or method of any one of Embodiments 3 and 4, wherein $PHR_R$ is at most 99.6%, or at most 99.4%, or at most 99.2%, or at most 99% of $PHR_I$.

Embodiment 6

The device or method of any one of Embodiments 3 to 5, wherein $PHR_R$ is at least 91%, or at least 93%, or at least 95% of $PHR_I$.

Embodiment 7

The device or method of any one of the preceding Embodiments, comprising an integration system configured to obtain the initial calculated area $A_I$ and the recalculated area.

Embodiment 8

The device or method of Embodiment 7, wherein the integration system is configured to calculate the area under the curve representing the pulse at least n times, where n is at least 2, or at least 3, or at least 4.

Embodiment 9

The device or method of Embodiment 8, wherein n is at most 8, or at most 7, or at most 6, or at most 5.

Embodiment 10

The device or method of any one of the preceding Embodiments, wherein the initial integration is over an initial integration time period $\Delta t_1$, and the subsequent integration includes a second integration over a second time period $\Delta t_2$, wherein $\Delta t_1$ and $\Delta t_2$ are different.

Embodiment 11

The device or method of Embodiment 10, wherein the difference between $\Delta t_1$ and $\Delta t_2$ is based on an intensity of the pulse.

Embodiment 12

The device or method of any one of Embodiments 10 and 11, wherein $\Delta t_2$ is at most 99%, or at most 97%, or at most 95%, or at most 93%, or at most 91%, or at most 89% of $\Delta t_1$.

Embodiment 13

The device or method of any one of Embodiments 10 to 12, wherein $\Delta t_2$ is at least 60%, or at least 65%, or at least 70%, or at least 75%, or at least 80% of $\Delta t_1$.

Embodiment 14

The device or method of any one of Embodiments 10 and 11, wherein $\Delta t_1$ is at most 99%, or at most 97%, or at most 95%, or at most 93%, or at most 91%, or at most 89% of $\Delta t_2$.

Embodiment 15

The device or method of any one of Embodiments 10 to 12, wherein $\Delta t_1$ is at least 60%, or at least 65%, or at least 70%, or at least 75%, or at least 80% of $\Delta t_2$.

Embodiment 16

The device or method of any one of Embodiments 10 to 15, wherein the difference between $\Delta t_1$ and $\Delta t_2$ is at least 1 ns, or at least 3 ns, or at least 5 ns, or at least 7 ns, or at least 9 ns, or at least 11 ns.

Embodiment 17

The device or method of any one of Embodiments 10 to 16, wherein the difference between $\Delta t_1$ and $\Delta t_2$ is at most 40 ns, at most 35 ns, or at most 30 ns, or at most 25 ns, or at most 20 ns.

Embodiment 18

The device or method of any one of Embodiments 10 to 17, wherein $\Delta t_2$ is less than $\Delta t_1$.

Embodiment 19

The device or method of any one of Embodiments 10 to 18, wherein $\Delta t_2$ is greater than $\Delta t_1$.

Embodiment 20

The device or method of any one of Embodiments 10 to 19, wherein the subsequent integration includes a third integration over a third integration time period $\Delta t_3$.

Embodiment 21

The device or method of any one of Embodiments 20, wherein the difference between $\Delta t_2$ and $\Delta t_3$ is based on an intensity of the pulse.

Embodiment 22

The device or method of any one of Embodiments 20 to 21, wherein $\Delta t_3$ is at most 99%, or at most 97%, or at most 95%, or at most 93%, or at most 91%, or at most 89% of $\Delta t_2$.

Embodiment 23

The device or method of any one of Embodiments 20 to 22, wherein $\Delta t_3$ is at least 60%, or at least 65%, or at least 70%, or at least 75%, or at least 80% of $\Delta t_2$.

Embodiment 24

The device or method of any one of Embodiments 20 to 22, wherein $\Delta t_2$ is at most 99%, or at most 97%, or at most 95%, or at most 93%, or at most 91%, or at most 89% of $\Delta t_3$.

Embodiment 25

The device or method of any one of Embodiments 20 to 22, wherein $\Delta t_2$ is at least 60%, or at least 65%, or at least 70%, or at least 75%, or at least 80% of $\Delta t_3$.

Embodiment 26

The device or method of any one of Embodiments 20 to 25, wherein the difference between $\Delta t_2$ and $\Delta t_3$ is at least 1 ns, or at least 3 ns, or at least 5 ns, or at least 7 ns, or at least 9 ns, or at least 11 ns.

Embodiment 27

The device or method of any one of Embodiments 20 to 26, wherein the difference between $\Delta t_2$ and $\Delta t_3$ is at most 40 ns, at most 35 ns, or at most 30 ns, or at most 25 ns, or at most 20 ns.

Embodiment 28

The device or method of any one of Embodiments 20 to 27, wherein $\Delta t_3$ is less than $\Delta t_2$.

Embodiment 29

The device or method of any one of Embodiments 20 to 28, wherein $\Delta t_3$ is greater than $\Delta t_2$.

Embodiment 30

The device or method of any one of the preceding Embodiments, wherein the device is adapted to operate in an environment having a temperature of at least 21° C., at least 50° C., or at least 100° C., or at least 150° C.

Embodiment 31

A radiation detection apparatus comprising a scintillator; a photosensor; and the analyzer device of any one of the proceeding Embodiments.

Embodiment 32

The apparatus of Embodiment 31, adapted to detect a gamma ray, an x-ray, a neutron, or any combination thereof.

Embodiment 33

The apparatus of any one of Embodiments 31 and 32, wherein the apparatus is a dual mode radiation detection apparatus adapted to detect gamma rays and neutrons.

Embodiment 34

The apparatus of any one of Embodiments 31 and 33, wherein the apparatus is adapted to detect radiation having an energy of 15 keV, or at least 25 keV, or at least 50 keV, or at least 75 keV, or at least 100 keV.

Embodiment 35

The apparatus of any one of Embodiments 31 to 34 adapted to detect radiation having an energy of at most 20 MeV, or at most 10 MeV, or at most 5 MeV, or at most 3 MeV.

Embodiment 36

The apparatus of any one of Embodiments 31 to 35, wherein the scintillator has a volume of at least 1500 cm$^3$, or at least 1700 cm$^3$, or at least 1900 cm$^3$.

Embodiment 37

The apparatus of any one of Embodiments 31 to 36, wherein the scintillator has a length of at least 31 cm, or at least 33 cm, or at least 35 cm, or at least 37 cm, or at least 39 cm.

Embodiment 38

The apparatus of any one of Embodiments 31 to 37, wherein the apparatus includes one of a security detection apparatus, an well-logging detection apparatus, a gamma ray spectroscopy apparatus, an isotope identification apparatus, Single Positron Emission Computer Tomography analysis apparatus, a Positron Emission Tomography analysis apparatus, and an x-ray imaging apparatus.

Embodiment 39

The apparatus of any one of Embodiments 31 to 38, wherein the apparatus is adapted to perform prompt-gamma neutron activation analysis.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. An analyzer device configured to:
    receive an output signal from a photosensor, the output signal comprising a pulse;
    provide the pulse to an integration system;
    obtain from the integration system an initial calculated area $A_I$ under a curve representing the pulse via an initial integration; and
    obtain from the integration system a recalculated area $A_R$ under the curve representing the pulse via a subsequent integration;
    wherein a spectrum based on the subsequent integration has an energy resolution $PHR_R$ that is less than an energy resolution $PHR_I$ of a spectrum based on the initial integration;
    wherein the photosensor produces the output signal in response to photons emitted by a scintillation device.

2. The device of claim 1, wherein the output signal includes a plurality of pulses, and an initial calculated area $A_I$ and recalculated area $A_R$ are obtained for each of the plurality of pulses.

3. The device of claim 1, further configured to obtain an energy resolution $PHR_R$ based on the recalculated area $A_R$.

4. The device of claim 1, wherein the integration system is within the analyzer device.

5. The device of claim 1, wherein the integration system is configured to calculate the area under the curve representing the pulse at least n times, where n is at least 2, or at least 3, or at least 4.

6. The device of claim 5, wherein n is at most 8, or at most 7, or at most 6, or at most 5.

7. The device of claim 1, wherein the initial integration is over an initial integration time period $\Delta t_I$, and the subsequent integration includes a second integration over a second time period $\Delta t_2$, wherein $\Delta t_1$ and $\Delta t_2$ are different.

8. The device of claim 7, wherein the difference between $\Delta t_1$ and $\Delta t_2$ is based on an intensity of the pulse.

9. The device of claim 7, wherein $\Delta t_2$ is at most 99%, or at most 97%, or at most 95%, or at most 93%, or at most 91%, or at most 89% of $\Delta t_1$.

10. The device of claim 7, wherein $\Delta t_1$ is at most 99%, or at most 97%, or at most 95%, or at most 93%, or at most 91%, or at most 89% of $\Delta t_2$.

11. The device of claim 1, further comprising a plurality of circuits configured to receive the output signal, obtain the initial calculated area $A_I$, and obtain the recalculated area $A_R$.

12. A radiation detection apparatus comprising:
a scintillator;
a photosensor; and
the analyzer device of claim 1.

13. A method of processing an output signal, comprising:
receiving the output signal from a photosensor comprising a pulse;
performing an initial integration to obtain an initial calculated area $A_I$ under a curve representing the pulse; and
performing a subsequent integration to obtain a recalculated area $A_R$ under the curve representing the pulse;
wherein the initial integration and the subsequent integration are performed by an integration system;
wherein a spectrum based on the subsequent integration has an energy resolution $PHR_R$ that is less than an energy resolution $PHR_I$ of a spectrum based on the initial integration.

14. The method of claim 13, further comprising obtaining an energy resolution $PHR_R$ based on the recalculated area $A_R$.

15. The method of claim 13, wherein the initial integration is over an initial integration time period $\Delta t_1$, and the subsequent integration includes a second integration over a second time period $\Delta t_2$, wherein $\Delta t_1$ and $\Delta t_2$ are different.

16. The method of claim 15, wherein the difference between $\Delta t_1$ and $\Delta t_2$ is based on an intensity of the pulse.

17. The method of claim 13, wherein the output signal includes a plurality of pulses, and an initial calculated area $A_I$ and recalculated area $A_R$ are obtained for each of the plurality of pulses.

18. The method of claim 13, further comprising calculating the area under the curve representing the pulse at least n times, where n is at least 2 and at most 8.

* * * * *